United States Patent
Yoshimura

(10) Patent No.: US 7,228,128 B2
(45) Date of Patent: Jun. 5, 2007

(54) AUTOMATIC CHARACTER CODE RECOGNITION/DISPLAY SYSTEM, METHOD, AND PROGRAM USING MOBILE TELEPHONE

(75) Inventor: Yuki Yoshimura, Tokyo (JP)

(73) Assignee: NEC Corporation, Tokyo (JP)

( * ) Notice: Subject to any disclaimer, the term of this patent is extended or adjusted under 35 U.S.C. 154(b) by 64 days.

(21) Appl. No.: 11/090,230

(22) Filed: Mar. 28, 2005

(65) Prior Publication Data
US 2005/0220343 A1 Oct. 6, 2005

(30) Foreign Application Priority Data
Mar. 31, 2004 (JP) ............................ 2004-105435

(51) Int. Cl.
*H04Q 7/20* (2006.01)
(52) U.S. Cl. ................ 455/422.1; 379/88.05; 379/88.06
(58) Field of Classification Search ............ 455/422.1, 455/412.1–414.4, 418–420; 382/173, 218
See application file for complete search history.

(56) References Cited

U.S. PATENT DOCUMENTS

| | | | |
|---|---|---|---|
| 6,073,147 A | 6/2000 | Chan et al. | 707/542 |
| 6,393,274 B1* | 5/2002 | Peltonen | 455/414.1 |
| 6,980,213 B1* | 12/2005 | Hirose et al. | 345/467 |
| 2004/0192282 A1* | 9/2004 | Vasudevan | 455/419 |

FOREIGN PATENT DOCUMENTS

| | | |
|---|---|---|
| JP | 10/240647 | 9/1998 |
| JP | 10-240647 | 11/1998 |
| JP | 2000-250899 | 9/2000 |
| JP | 2002-259281 | 9/2002 |
| JP | 2003-114844 | 4/2003 |
| JP | 2003/208383 | 7/2003 |
| KR | 2003-0003333 | 1/2002 |

OTHER PUBLICATIONS

European Patent Office Search Report, dated Jan. 30, 2007, pp. 1-3.

* cited by examiner

*Primary Examiner*—Duc M. Nguyen
*Assistant Examiner*—Justin Lee
(74) *Attorney, Agent, or Firm*—Whitham Curtis Christofferson & Cook, PC

(57) ABSTRACT

In one embodiment, when a mobile telephone accessible to the Internet accesses a homepage provider server, character codes of the homepage accessed is identified. Thereafter, a homepage is displayed using character codes in the mobile telephone on the basis of the identification. The homepage provider server provides information for identifying character codes. A character code provider always updates and registers the latest character codes. The mobile telephone accesses the homepage provider server and the character code provider through wireless telephone network and the Internet.

14 Claims, 4 Drawing Sheets

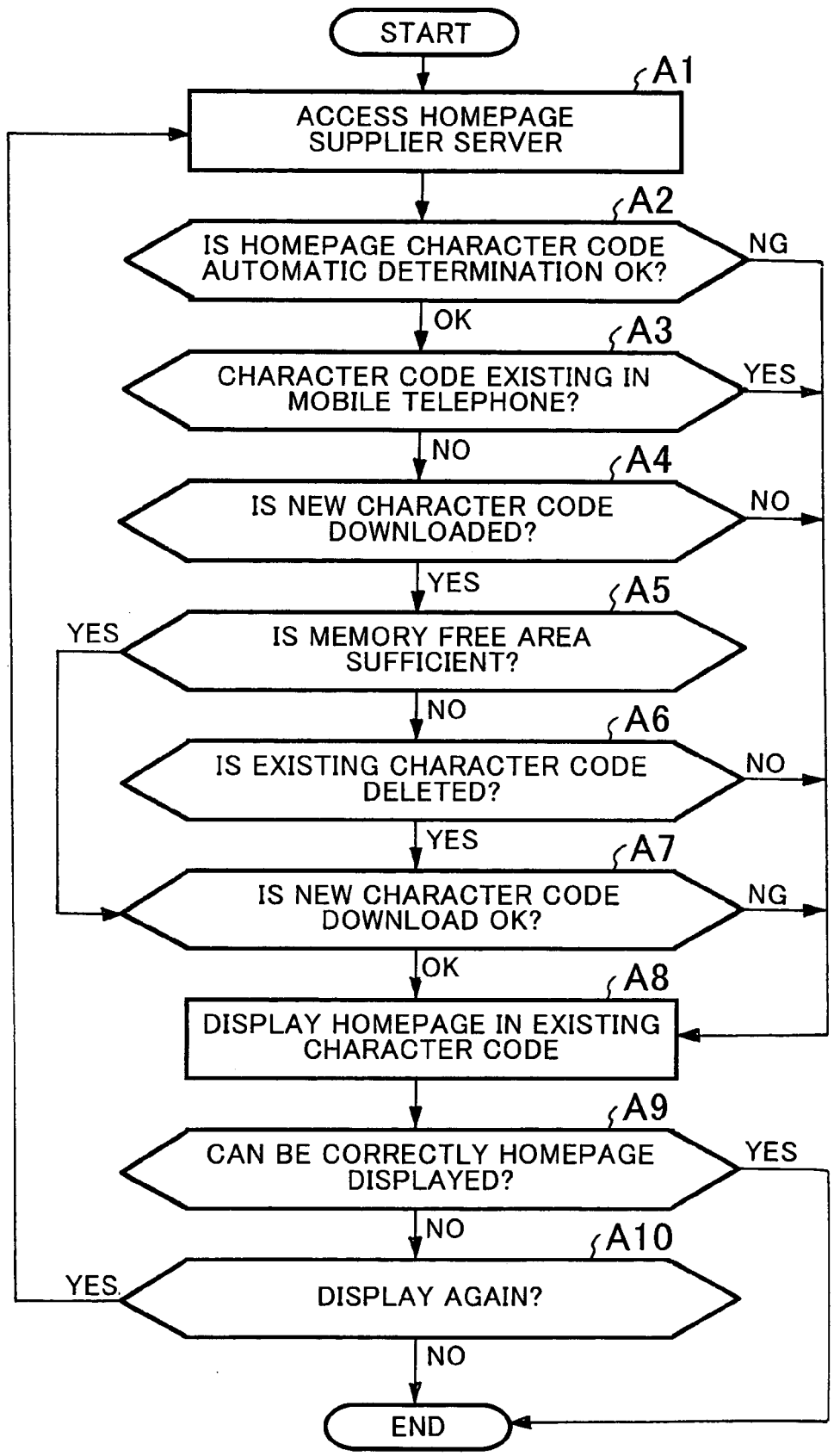

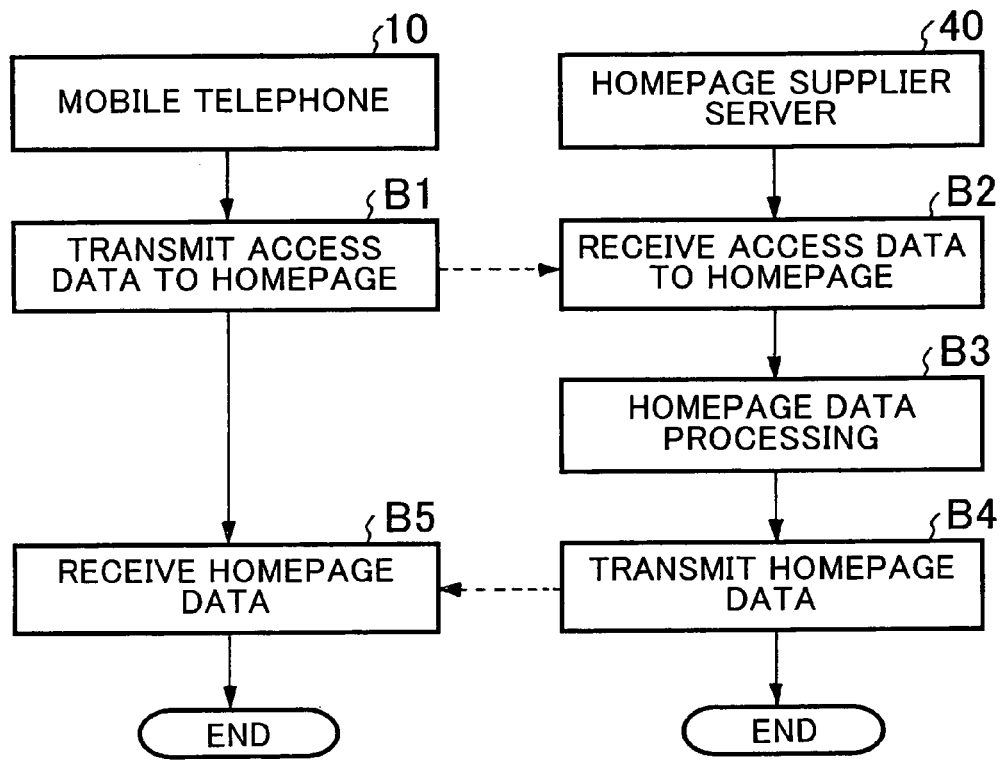
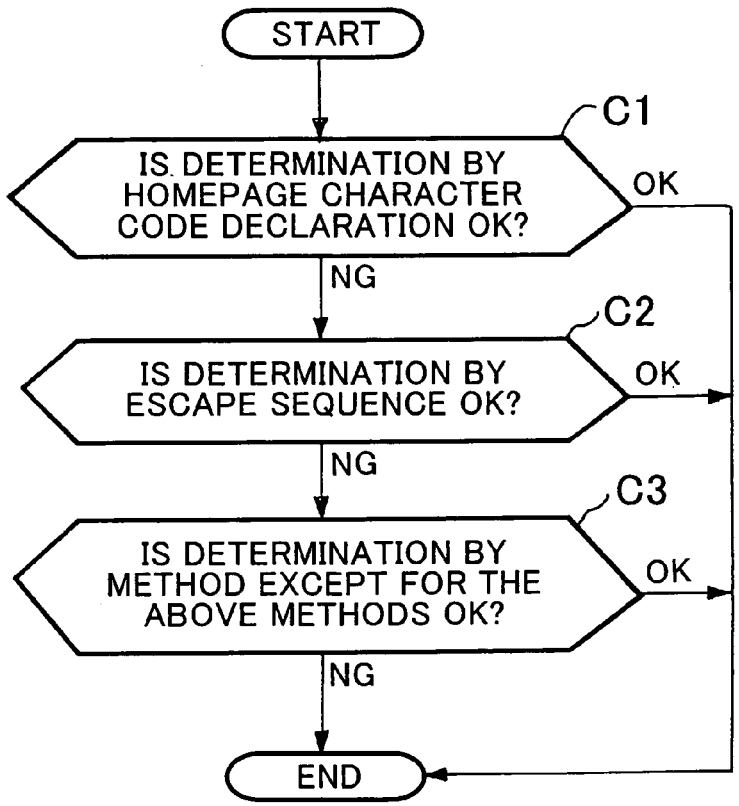

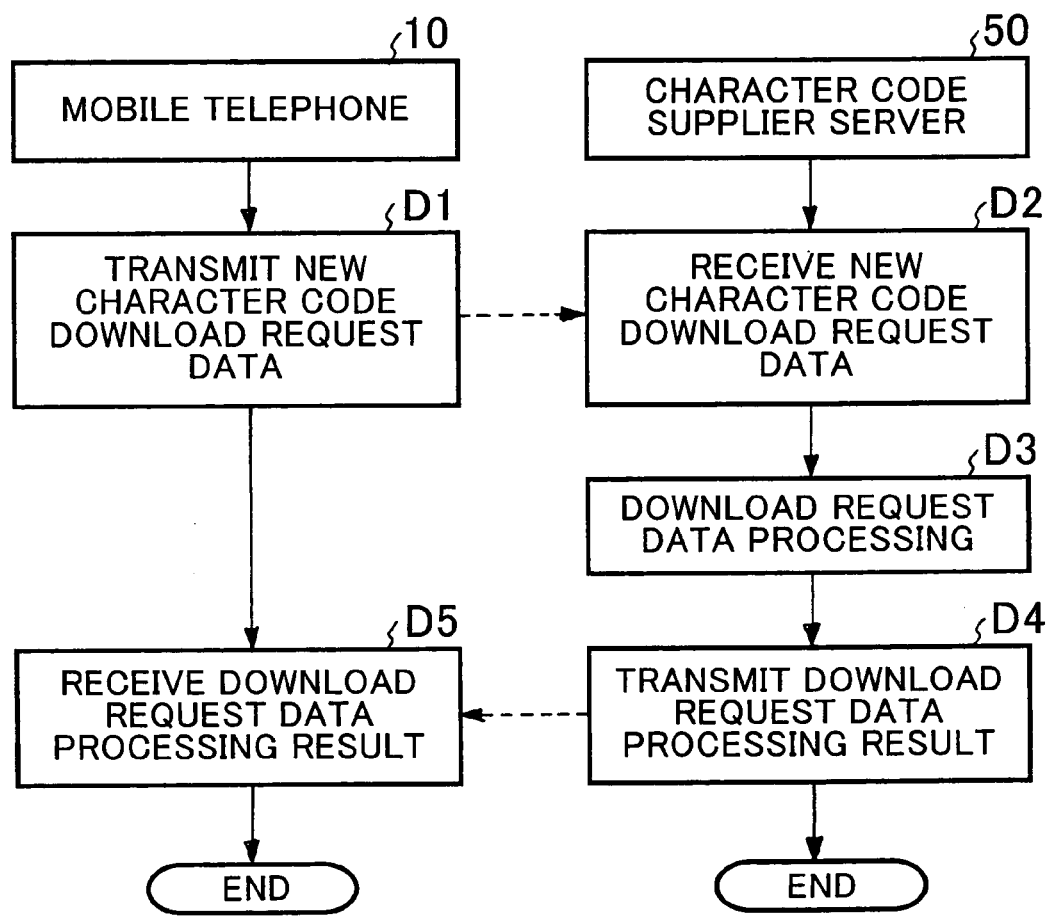

AUTOMATIC CHARACTER CODE RECOGNITION/DISPLAY SYSTEM, METHOD, AND PROGRAM USING MOBILE TELEPHONE

BACKGROUND OF THE INVENTION

1. Field of the Invention

The present invention relates to an automatic character code recognition/display system, method, and program and, in particular, an automatic character code recognition/display system, method, and program which can recognize a character code of a homepage when a holder of a mobile telephone which can access the Internet through a public wireless communication network accesses an arbitrary homepage supplier server and correctly display the contents of the homepage such that an appropriate character code in the mobile telephone is selected.

2. Description of the Related Art

In a conventional character code recognition/display system, only a homepage of a specific character code can be correctly displayed. However, when a homepage of another character code is displayed, a new mobile telephone having a character code of a homepage to be displayed must be bought.

Conventional technique documents related to the present invention are as follows.

Japanese Patent Application Laid-open No. 2000-250899
Japanese Patent Application Laid-open No. 2002-259281
Japanese Patent Application Laid-open No. 2003-114844
Japanese Patent Application Laid-open No. 10-240647
Japanese Patent Application Laid-open No. 2003-208383

However, the convention character code recognition/display system has the following problems.

More specifically, when a user displays a homepage using a character code other than a specific character code, a character code of the homepage to be displayed is not included in a mobile telephone. For this reason, a new mobile telephone having the character code must be bought.

SUMMARY OF THE INVENTION

Therefore, according to the present invention, in order to solve the conventional problem, when a homepage supplier server is accessed by a mobile telephone of a user which can access the Internet at any time, a character code of a homepage to be accessed is determined, a character code included in the mobile telephone is selected on the determination result, and the contents of the homepage are displayed. Furthermore, it is an object of the present invention to provide an automatic character code recognition/display system, method, and program which use a mobile telephone and which, when the character code of the homepage desired to be displayed is not included in a mobile telephone of a user, can download a new character code from a character code supplier server through the Internet without buying a new mobile telephone including the character code.

According to the present invention, there is provided an automatic character code recognition/display system using a mobile telephone and including a mobile telephone to be connected to the Internet through a public wireless communication network, a homepage supplier server to be connected to the Internet, and a character code supplier server, wherein the mobile telephone comprises: means for transmitting access data to the homepage supplier server when the mobile telephone accesses the homepage supplier server; means for receiving homepage data from the homepage supplier server to automatically determine a homepage character code of the mobile telephone; means for performing automatic recognition to determine whether the homepage character code is a character code existing in the mobile telephone when the automatic determination of the homepage character code of the mobile telephone is successful; means for supplying a user a selecting screen for determining whether a new character code is downloaded when the homepage character code is not included in the mobile telephone; means for checking a memory free area when the user selects that the new character code is downloaded on the mobile telephone; means for supplying the user a selection screen for determining whether a part of the existing character codes is deleted to secure a necessary memory area when the memory free area is not sufficient; means for deleting an unnecessary character code from the existing character codes until the necessary free memory area is secured by an operation of a holder of the mobile telephone when the user selects that the part of the existing character codes is deleted on the mobile telephone; means for securing a free memory area required to download the new character code and to transmit new character code download request data to the character code supplier server; means for receiving a download request data processing result from the character code supplier server and downloads the new character code for the mobile telephone; and means for displaying a homepage in the new character code downloaded on the mobile telephone and serving as a most appropriate character code in the existing character codes (including the downloaded new character code) in the mobile telephone when the download of the new character code on the mobile telephone is successful.

The automatic character code recognition/display system using a mobile telephone, may further comprise: means which accesses the homepage supplier server again when the user wants to display the contents of the homepage again when the contents of the homepage cannot be correctly displayed in an existing character code of the mobile telephone.

In the automatic character code recognition/display system using a mobile telephone, the character code supplier server may comprise: a character code data management/accumulation means which registers character code data being able to be used by the holder of the mobile telephone at any time and which supplies necessary code data depending on a new character code download request from the holder of the mobile telephone.

In the automatic character code recognition/display system using a mobile telephone, when the automatic determination of the homepage character code of the mobile telephone is unsuccessful, the homepage may be displayed in a default character code which is a most appropriate character code in the existing character codes of the mobile telephone and which can be set by the user.

In the automatic character code recognition/display system using a mobile telephone, when it is determined that the homepage character code is a character code existing in the mobile telephone, the homepage may be displayed in a character code which is a most appropriate character code in the existing character codes of the mobile telephone and which exists in the mobile telephone.

In the automatic character code recognition/display system using a mobile telephone, when the user selects that a new character code is not downloaded on the mobile telephone, the homepage may be displayed in a default character code which is a most appropriate character code in the existing character codes of the mobile telephone and which can be set by the user.

The automatic character code recognition/display system using a mobile telephone may further comprise: means which checks a memory free area when the user selects that a new character code is downloaded on the mobile telephone and which causes the mobile telephone to transmit character code download request data to the character code supplier server.

The automatic character code recognition/display system using a mobile telephone, wherein the mobile telephone may check a memory free area when the user selects that the new character code is downloaded on the mobile telephone, a selecting screen for determining whether a part of the existing character codes is deleted to secure a necessary free memory area required for the user in the mobile telephone may be displayed when the free memory area is not sufficient, and the homepage may be displayed in a default character code which is a most appropriate character code in the existing character codes of the mobile telephone and which can be set by the user when the user selects that the part of the existing character codes in the mobile telephone is not deleted.

In the automatic character code recognition/display system using a mobile telephone, when download of the new character code for the mobile telephone is unsuccessful, the homepage may be displayed in a default character code which is a most appropriate character code in the existing character codes of the mobile telephone and which can be set by the user.

It is a first effect of the present invention that a new necessary character code can be downloaded from a character code supplier server through the Internet anytime and anywhere without buying a new mobile telephone even though a character code of a homepage to be displayed is not included in a mobile telephone on hand and can immediately display the homepage.

This is because the character code supplier server processes new character code download request data received from the mobile telephone and transmits a processing result of the download request data to the mobile telephone.

It is a second effect of the present invention to make it possible to display a homepage by selecting an appropriate character code in a mobile telephone without manually changing a setting of a character code of a mobile telephone when a user displays a homepage having a character code except for a specific character code and when the character code of the homepage is a character code included in the mobile telephone.

This is because, when a homepage supplier server is accessed, automatic determination of a homepage character code is performed to a homepage received by the mobile telephone. It is a third effect to make it possible that a mobile telephone held by a user can always have a latest necessary character code. This is because, before the user downloads a new character code, the mobile telephone checks a memory free area to make it possible to delete an unnecessary character code.

BRIEF DESCRIPTION OF THE DRAWINGS

FIG. 2 is a flow chart showing all operations of the embodiment of the present invention;

FIG. 3 is a sequential diagram showing a homepage data acquiring procedure;

FIG. 4 is a flow chart showing an automatic determining operation of a homepage character code; and FIG. 5 is a sequential diagram showing a new character code download procedure.

DESCRIPTION OF THE PREFERRED EMBODIMENTS

Figure 1:
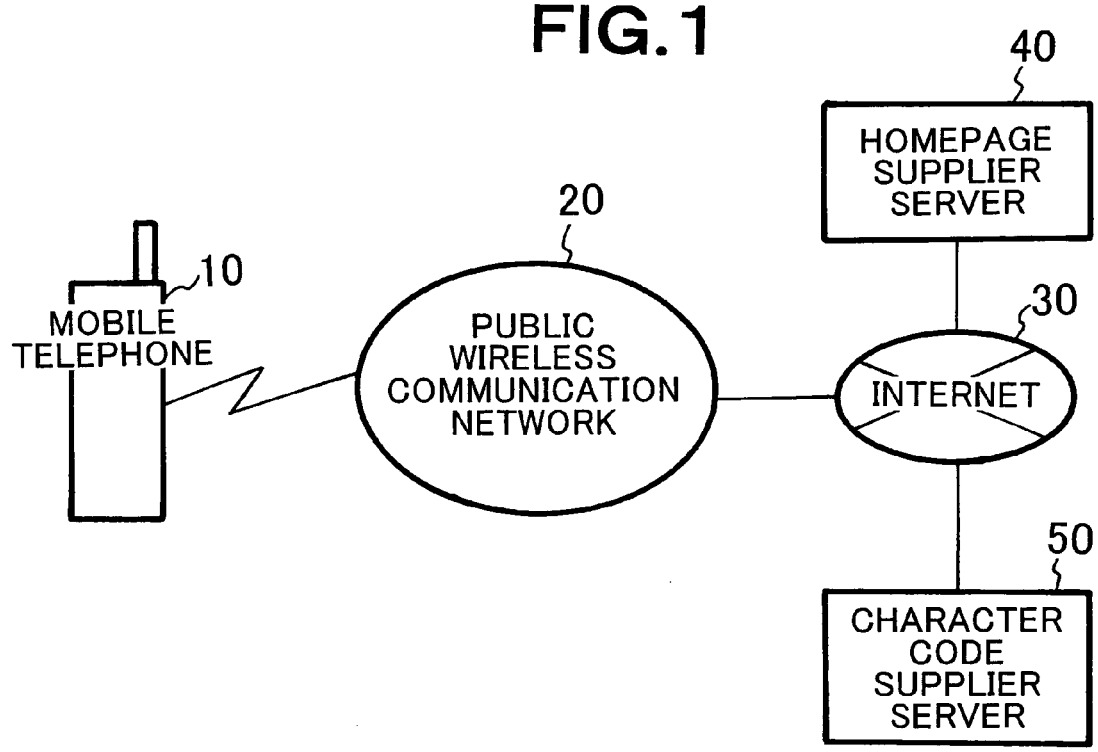
FIG. 1 is a diagram showing a configuration of embodiment of the present invention.

A preferred embodiment of the present invention will be described hereinafter in detail with reference to the accompanying drawings.

FIG. 1 is a diagram showing a configuration of an embodiment of the present invention.

Referring to FIG. 1, the embodiment of the present invention includes a mobile telephone 10, a public wireless communication network 20, the Internet 30 connected to the public wireless communication network 20, a homepage supplier server 40 connected to the Internet 30, and the character code supplier server 50. In FIG. 1, a communication network illustrated as the Internet 30 may be a communication network except for the Internet.

The mobile telephone 10 is a mobile telephone set having a unit connected to the Internet 30 through the public wireless communication network 20. The mobile telephone 10 has a unit which accesses the homepage supplier server 40 and the character code supplier server 50 through the Internet 30 and exchanges homepage information or new character code download information with a homepage opened by the homepage supplier server 40 and the character code supplier server 50 to display the homepage and the homepage information or the new character code download information. The mobile telephone 10 includes: a unit which transmits access data to the homepage supplier server 40 when a user accesses the homepage supplier server 40 through the mobile telephone 10 held by the user; a unit which receives homepage data from the homepage supplier server 40 to automatically determine a homepage character code of the mobile telephone 10; a unit which performs automatic recognition to determine whether the homepage character code is a character code existing in the mobile telephone 10 when the automatic determination of the homepage character code of the mobile telephone 10 is OK ("OK/NG" mean "success/unsuccess" as the automatic determination results hereinafter.); a unit which causes the mobile telephone 10 to supply the user a selecting screen for determining whether a new character code is downloaded when the homepage character code is not included in the mobile telephone 10; a unit which causes the mobile telephone 10 to check a memory free area when the user selects that the new character code is downloaded on the mobile telephone 10 and which causes the mobile telephone 10 to supply the user a selection screen for determining whether a part of the existing character codes is deleted to secure a necessary memory area when the memory free area is not sufficient; a unit which deletes an unnecessary character code from the existing character codes until the necessary free memory area is secured by an operation of a holder of the mobile telephone 10 when the user selects that the part of the existing character codes is deleted on the mobile telephone 10; a unit which causes the mobile telephone 10 to secure a free memory area required to download the new character code and to transmit new character code download request data to the character code supplier server 60; a unit which receives a download request data processing result from the character code supplier server 50 and then downloads the new character code for the mobile telephone 10; and a unit which displays a homepage in a most appropriate character code (in this case, the mobile telephone selects the downloaded new character code) in the existing character codes (including the downloaded new character code) in the mobile telephone 10 when the download of the new character code on the mobile telephone 10 is OK ("OK/NG" mean "success/unsuccess" as the download results hereinafter.).

The homepage supplier server 40 has a unit which receives data for accessing the homepage received from the mobile telephone 10, performs homepage data processing, and transmits generated homepage data to the mobile telephone 10 through the Internet 30.

The character code supplier server 50 has a character code data management/accumulation unit which opens a homepage, registers character code data which can be used by a holder of the mobile telephone 10 at any time, and supplies necessary character code data depending on a new character code download request from the holder of the mobile telephone 10. The character code supplier server 50 has a unit which processes the new character code download request data received from the mobile telephone 10 and transmits a generated download request data processing result to the mobile telephone 10 through the Internet 30.

Operations of the embodiment of the present invention will be described in detail below with reference to FIGS. 1 to 5.

FIG. 2 is a flow chart showing all operations of the embodiment of the present invention. FIG. 3 is a sequential diagram showing a homepage data acquiring procedure. FIG. 4 is a flow chart showing an automatic determining operation of a homepage character code. FIG. 5 is a sequential diagram showing a new character code download procedure.

Referring to FIG. 2, when a user holding the mobile telephone 10 wants to see a homepage, the user accesses the homepage supplier server 40 connected to the Internet 30 through the public wireless communication network 20 at any time and any place (step A1).

On the basis of the homepage acquiring procedure shown in FIG. 3, a homepage data acquiring process is performed. The details of the homepage data acquiring process are as follows.

Referring to FIG. 3, a user holding the mobile telephone 10 accesses the homepage supplier server 40, data for accessing a homepage from the mobile telephone 10 is transmitted to the homepage supplier server 40 connected to the Internet 30 through the public wireless communication network 20 (step B1). The homepage supplier server 40 receives the data for accessing the homepage (step B2). The data is processed to form. homepage data for transmission (step B3). The formed homepage data is transmitted to the mobile telephone 10 through the Internet 30 (step B4). The mobile telephone 10 receives the homepage data (step B5). The mobile telephone 10 performs automatic determination of a homepage character code on the basis of an automatic determining procedure of a homepage character code shown in FIG. 4 (step A2). The details of the automatic determination are as follows.

Referring to FIG. 4, determination is performed by declaration of a homepage character code (step C1).

When the automatic determination is NG, determination is performed by an escape sequence (step C2).

When the automatic determination is NG, determination is performed by a method (for example, a determination method or the like performed by setting high-order bits) except for the above method (step C3).

When the automatic determination result is OK, automatic recognition for checking whether the character code is a character code included in the mobile telephone 10 (step A3).

When it is determined that the character code is not included in the mobile telephone 10, the mobile telephone 10 supplies a selection screen for determining whether a new character code is downloaded to the a user (step A4).

When the user selects that the new character code is downloaded on the mobile telephone 10, the mobile telephone 10 checks a memory free area (step A5). When the memory free area is not sufficient, the mobile telephone 10 supplies a selection screen for determining whether a part of the existing character codes is deleted to secure a necessary free memory area to the user (step A6).

When the user selects that the part of the existing character codes is deleted on the mobile telephone 10, an unnecessary character code is deleted from the existing character codes until the free memory area can be secured by an operation of the holder of the mobile telephone 10. The mobile telephone 10 secures a free memory area required to download the new character code and a download process of the new character code on the basis of a new character code download procedure shown in FIG. 5 (step A7). The details of the download process will be described below.

Referring to FIG. 5, new character code download request data from the mobile telephone 10 is transmitted to the character code supplier server 50 connected to the Internet 30 through the public wireless communication network 20 (step D1). The character code supplier server 50 receives the new character code download request data (step D2). The data is processed to form a transmission download request data processing result (step D3). The formed download request data processing result is transmitted to the mobile telephone 10 through the Internet 30 (step D4). The mobile telephone 10 receives the download request data processing result (step D5). When download of a new character code on the mobile telephone 10 is OK, a homepage is displayed in a most appropriate character code (In this case, the mobile telephone selects the downloaded new character code.) in the existing character codes (including the downloaded new character code) of the mobile telephone 10 (step A8). After the homepage is displayed, when it is determined that the homepage is not correctly displayed (step A9), a user holding the mobile telephone 10 can access the homepage supplier server 40 again when the user wants to display the homepage contents again (step A10).

The user holding the mobile telephone 10 can access the character code supplier server 50 through the Internet 30 by using the mobile telephone 10 at any time and any place and can collect and check necessary new character code related information. In addition, the user can easily delete a character code which has been downloaded as needed.

In the embodiment according to the present invention, a program or the like for executing a processing operation of an automatic character code recognition/display system using a mobile telephone is recorded as data on a recording medium (not shown) such as a magnetic disk or an optical disk included in a computer, so that the recorded data is installed on the mobile telephone and used to operate the automatic character code recognition/display system using the mobile telephone.

In this manner, the data for operating the automatic character code recognition/display system using a mobile telephone according to the present invention is recorded on a recording medium, so that the data on the recording medium is installed on the mobile telephone to make it possible to realize the automatic character code recognition/display system using the mobile telephone.

The present invention can be used to display a homepage on a mobile telephone.

What is claimed is:

1. An automatic character code recognition/display system comprising:
    a mobile telephone connectable to the Internet through a public wireless communication network, having means for transmitting a homepage access request in response to a user-input command;
    a homepage supplier server connectable to the Internet, having means for transmitting homepage data in response to said homepage data request, said homepage data having character code information; and
    a character code supplier server connectable to the Internet, having means for transmitting a new character code in response to receiving a new character code download request data, wherein
    the mobile telephone further comprises:
    means for receiving said homepage data from the homepage supplier server;
    means for automatically determining whether or not a homepage character code of the mobile telephone can be successfully identified from the character code information of the homepage data and for generating a homepage character code determination successful data and a homepage character code if said determining is successful, and a homepage character code determination unsuccessful data if said determining is unsuccessful;
    means for performing, in response to said homepage character code determination successful data, automatic recognition of whether the homepage character code is a character code existing in the mobile telephone, and for generating one of a character code extant data and a character code non-extant data, respectively, in response;
    means for displaying, in response to said character code non-extant data, a first graphical user interface screen having a field for the user to enter a download new character code command;
    means for checking a memory free area when the user enters said download new character code command and for generating a free memory data indicating whether or not the memory free area is sufficient to download the new character code;
    means for displaying, in response to the free memory data indicating that there is not sufficient free memory area to download the new character code, a second graphical user interface screen having a field for the user to enter a delete existing character codes command;
    means for deleting, in response to the user entering said delete existing character codes command, existing character codes until the necessary free memory area is secured;
    means for transmitting, in response to said necessary free memory area being secured, said new character download request data to the character code supplier server;
    means for downloading a new character code from the character code supplier server corresponding to the new character code download command input by the user to said first graphical user interface screen;
    means for identifying whether said downloading a new character code is successful and for generating one of a download new character code successful data and a failed download new character code data, respectively, in response;
    means for selecting a most appropriate character code for displaying a homepage, from among the character codes existing in the mobile telephone, wherein said selecting selects the new character code in response to said download successful data; and
    means for displaying a homepage in the most appropriate character code selected by said means for selecting.

2. The automatic character code recognition/display system of claim 1, wherein the character code supplier server further comprises:
    a character code data management/accumulation means for maintaining a register of character code data compatible with mobile telephone, and wherein said means for transmitting a new character code data to the mobile telephone transmits said new character code data based, at least in part, on said register and the new character code download command input to the first graphical user interface screen by the user of the mobile telephone.

3. The automatic character code recognition/display system of claim 1, wherein said means for selecting a most appropriate character code for displaying a homepage selects, in response to said homepage character code determination unsuccessful data, a default character code from among the existing character code of the mobile telephone, and wherein said means for selecting a most appropriate character code includes means for the user to preselect said default character code.

4. The automatic character code recognition/display system of claim 1, wherein said means for displaying a homepage displays said homepage in the homepage character code in response to said character code extant data.

5. The automatic character code recognition/display system of claim 1, wherein
    said means for displaying said first graphical user interface screen generates said first graphical user interface screen to further include a field for the user to enter a decline download command, and wherein
    said means for selecting a most appropriate character code for displaying a homepage, in response to the user entering said decline download command, a default character code as the most appropriate character code, said default character code being in the existing character codes of the mobile telephone and wherein said means for selecting a most appropriate character code includes means for the user to preselect said default character code.

6. The automatic character code recognition/display system of claim 1, wherein
    the mobile telephone checks a memory free area when the user selects that the new character code is downloaded on the mobile telephone, and
    the second graphical user interface screen is generated to further include a field for the user to enter a do not delete character codes command, and
    wherein said means for selecting a most appropriate character code for displaying a homepage selects, in response to the user entering said do not delete existing character codes command, a default character code from among the existing character code of the mobile telephone, and wherein said means for selecting a most appropriate character code further includes means for the user to preselect said default character code.

7. The automatic character code recognition/display system of claim 1, wherein
said means for selecting a most appropriate character code for displaying a homepage selects, in response said failed download new character code data, a default character code from among the existing character code of the mobile telephone, and wherein said means for selecting a most appropriate character code further includes means for the user to preselect said default character code.

8. An automatic character code recognition/display method for a mobile telephone connectable to the Internet through a public wireless communication network, comprising:
storing a homepage data, having character code information, on homepage supplier server connectable to the Internet;
storing a new character code on a character code supplier server connectable to the Internet;
receiving, at said mobile telephone, a user-input homepage access command;
transmitting access data from the mobile telephone to the homepage supplier server, in response to the receiving a user-input homepage access command;
transmitting said homepage data, from the homepage supplier server to the mobile telephone, in response to receiving said access data;
receiving, at the mobile telephone, said homepage data from the homepage supplier server;
automatically determining, at said mobile telephone, whether or not a homepage character code of the mobile telephone can be identified from the character code information of the received homepage data;
generating, based on said automatic determining, a homepage character code and a homepage character code determining successful data if said determining is successful, and a homepage character code determination unsuccessful data if said determining is unsuccessful;
determining, in response to said homepage character code determination successful data, whether the homepage character code is a character code existing in the mobile telephone;
displaying, in response to said determining step determining that the homepage character code is a character code not existing in the mobile telephone, a first graphical user interface screen on the mobile telephone, said first graphical user interface screen having a field for the user to input a download new character command;
checking a memory free area of the mobile telephone in response to the user entering the download new character code command;
displaying, in response to said checking indicating insufficient free memory area to download the new character code, a second graphical user interface screen having a field for the user to enter a delete existing character codes command;
deleting character code from the existing character codes in response to the delete existing character codes command entered in the second graphical user interface screen;
transmitting, in response to said deleting being performed until a necessary free memory area is secured, a new character code download request data from the mobile telephone to the character code supplier server;
downloading a new character code from the character code supplier server to the mobile telephone, in response to said new character code download request;
determining whether or not said downloading of a new character code is successful;
selecting a most appropriate character code for displaying a homepage, from among the character codes existing in the mobile telephone, wherein said selecting selects the new character code in response to said determining step determining that said downloading was successful; and
displaying mobile telephone a homepage in the most appropriate character code selected by said selecting.

9. The automatic character code recognition/display method of claim 8, further comprising:
maintaining a register in the character code supplier server of registers character code data compatible with the mobile telephone wherein said downloading is based, at least in part, on said register and said new character code command input to the first graphical user interface.

10. The automatic character code recognition/display method of claim 8, further comprising:
receiving, at the mobile telephone, a user-entered default code command;
assigning a character code from among the existing character codes of the mobile telephone as a default character code, based on said user-entered default code command, and wherein
in response to said homepage character code determination unsuccessful data, said selecting a most appropriate character code for displaying a homepage selects said default character code.

11. The automatic character code recognition/display method of claim 8, wherein
in response to said determining whether the homepage character code is a character code existing in the mobile telephone determines that the homepage character code exists in the mobile telephone, said selecting a most appropriate character code for displaying a homepage selects said character code existing in the mobile telephone.

12. The automatic character code recognition/display method of claim 8, further comprising:
receiving, at the mobile telephone, a user-entered default code command;
assigning a character code from among the existing character codes of the mobile telephone as a default character code, based on said user-entered default code command,
wherein a said first graphical user interface screen on the mobile telephone further includes a field for the user to enter a do not download new character command, and wherein,
in response to the user entering the do not download command, said selecting a most appropriate character code for displaying a homepage selects said default character code.

13. The automatic character code recognition/display method of claim 8, further comprising:
receiving, at the mobile telephone, a user-entered default code command; and
assigning a character code from among the existing character codes of the mobile telephone as a default character code, wherein said second graphical user interface screen further includes a field for the user to enter a do not delete existing codes command, and in response to the user entering the do not delete existing codes command, said selecting a most appropriate character code for displaying a homepage selects said default character code.

14. The automatic character code recognition/display method using a mobile telephone according to claim 8, further comprising:

receiving, at the mobile telephone, a user-entered default code command;

assigning a character code from among the existing character codes of the mobile telephone as a default character code, wherein in response to said homepage character code determination unsuccessful data, generated by said generating a homepage character code determination unsuccessful data if said determining is unsuccessful, said selecting a most appropriate character code for displaying a homepage selects said default character code.

* * * * *